United States Patent [19]

Pessimisis

[11] 4,102,821

[45] Jul. 25, 1978

[54] METHOD FOR PREPARING AN ALUMINA AS A SUPPORT FOR A HYDROTREATING CATALYST

[75] Inventor: George N. Pessimisis, Berwyn, Ill.

[73] Assignee: Nalco Chemical Company, Oak Brook, Ill.

[21] Appl. No.: 801,878

[22] Filed: May 31, 1977

Related U.S. Application Data

[63] Continuation-in-part of Ser. No. 662,498, Mar. 1, 1976.

[51] Int. Cl.² ............................................. B01J 21/04
[52] U.S. Cl. ................................... 252/463; 252/465; 252/466 J; 208/216; 423/626; 423/628
[58] Field of Search .................... 252/463, 465, 466 J; 208/216; 423/626, 628

[56] References Cited

U.S. PATENT DOCUMENTS

| | | | |
|---|---|---|---|
| 3,032,515 | 5/1962 | Hinsvark | 252/466 J |
| 3,232,887 | 2/1966 | Pessimisis | 252/470 X |
| 3,814,683 | 6/1974 | Christman et al. | 208/216 |
| 3,876,557 | 4/1975 | Bland | 252/466 J |
| 4,038,177 | 7/1977 | Eberly | 252/465 X |

*Primary Examiner*—W. J. Shine
*Attorney, Agent, or Firm*—John G. Premo; Robert A. Miller; Barry W. Sufrin

[57] ABSTRACT

A method for preparing a hydrotreating catalyst having a controlled pore distribution is disclosed. The method requires adding to the alumina prior to forming from 0.1 to 15% by weight of a water soluble polycarboxylic acid having from 2 – 22 carbon atoms. The resulting formed alumina support after being calcined has a pore volume distribution such that most of the pore volume in pores greater than 200 Å in diameter as measured by Mercury penetration porosimitry is substantially eliminated. The pore volume as measured by nitrogen adsorption in the range of between 100 Å and 1200 Å is reduced. The polycarboxylic acid may be added to the catalyst carrier prior to forming in different ways such as by dissolving the catalytically active metals with the water soluble polycarboxylic acid and then impregnating hydrothermally or by pore volume or by adding a water soluble polycarboxylic acid salt to the hydrous or xero gel after precipitation.

3 Claims, No Drawings

METHOD FOR PREPARING AN ALUMINA AS A SUPPORT FOR A HYDROTREATING CATALYST

This is a continuation-in-part application of Serial No. 662,498 filed March 1, 1976, now abandoned.

Alumina supported catalysts are used for a variety of applications and are generally well known in the art. One quality which is often necessary for these catalysts to possess is a pore size range which will give advantageous results for the particular application to which these aluminas are used. A controlled pore size alumina support is important in that it allows for the maximum utilization of the catalyst without sacrificing physical properties such as crush strength and attrition. Pore size must also be carefully controlled where a molecular sieve type of function for the catalyst is desired.

The preparation of aluminas having a pore distribution which is substantially devoid of pores within the range of 140,000 to 200 Å has been sought due to its important use in areas such as hydrodesulfurization. A process utilizing a catalyst having a controlled pore distribution with this range for hydrodesulfurization is disclosed in U.S. Pat. No. 3,814,683.

While the prior art has used many methods for the preparation of alumina supports having characteristics described above, these processes have been time consuming expensive and have involved numerous mechanical steps. It would therefore be an advantage to the art if aluminas having a controlled pore distribution could be prepared with a minimization of the mechanical steps by the addition of a relatively inexpensive chemical additive.

OBJECTS

It is, therefore, an object of the present invention to provide the art a method for the preparation of an alumina catalyst support or catalyst having a controlled pore distribution.

It is a further object of this invention to provide the art a method for the control of pore distribution in alumina supports by the addition of a polycarboxylic acid to the alumina prior to forming.

It is a still further object of this invention to provide the art a method for preparing a controlled pore distribution alumina support by the addition of a water soluble aliphatic polycarboxylic acid containing from 2–22 carbon atoms prior to forming the alumina so as to form a superior catalyst support and catalyst useful for hydrodesulfurization and hydrodenitration processes.

It is a still further and important object of this invention to provide the art a method for the preparation of an alumina support having a controlled pore distribution by the addition of a water soluble aliphatic polycarboxylic acid containing from 2–22 carbon atoms prior to forming the alumina so as to form a superior catalyst support and catalyst using a minimum amount of mechanical steps.

Other objects will appear hereinafter.

BACKGROUND OF THE INVENTION

The method of pore volume determination is essential to the characterization of my invention. Mercury penetration techniques indicate that there is substantially no pore volume above 200 Å in diameter in the aluminas of my invention. However nitrogen absorption techniques indicate that while some pore volume in aluminas prepared by my invention exists above 100 Å, the pore volume in this range can be substantially reduced over a comparable alumina not treated in accordance with this invention. The difference between mercury penetration techniques and nitrogen absorption is a well-known phenomenon and thought to occur as a result of the pore configuration. Pores which are cylindrical in shape will give similar nitrogen absorption and nitrogen desorption isotherms. Irregularly shaped pores or "ink bottle" shaped pores will have significantly different pore volume distributions depending on the method of determination. For "ink bottle" shaped pores or pores having narrow entrances, the nitrogen desorption and mercury intrusion pore volume distributions are thought to be representative of the size of the pore opening or pore orifice. However, nitrogen absorption is not influenced by the pore opening but rather reflects the average diameter profile of the entire pore. This difference is important in characterizing catalysts since the size of the pore opening or orifice will act as a screen to the size of molecule which can diffuse into the catalyst. The alumina made by the use of my invention gives pore volume distributions which are typical of those thought to be caused by restricted or narrow necked openings to pores.

Thus, the novel alumina described in this invention provided an improvement in the art in that it allows molecules of a selective size to pass through an orifice into an enlarged pore cavity where maximum surface area is available for reaction.

THE INVENTION

The method of my invention in which I prepare alumina supports having a controlled pore size generally encompasses the steps of:
(A) Precipitating an alumina;
(B) Reducing the moisture content of said alumina;
(C) Washing and purifying said alumina;
(D) Forming said alumina;
(E) drying said alumina; and then,
(F) Calcining said alumina; the improvement comprising adding to the alumina prior to forming from 0.1 to 15.0% by weight based on the dry weight of the alumina of a water soluble polycarboxylic acid having 2–22 carbon atoms whereby a catalyst support having substantially diminshed pore volume in the range of 100–1200 Å is prepared.

When a hydrotreating catalyst having a controlled pore size is prepared in accordance with my invention, the steps generally followed in the preparation include:
(A) Precipitating an alumina;
(B) Reducing the moisture content of said alumina;
(C) Washing and purifying said alumina;
(D) Impregnating said alumina with one or more catalytically active metals from the group consisting of cobalt; molybdenum, nickel and tungsten;
(E) Forming said alumina;
(F) Calcining the dried, formed, impregnated alumina to prepare a hydrotreating catalyst, the improvement comprising adding during the impregnation of the alumina; at least one of the metals in the form of a water soluble polycarboxylic acid salt such that the polycarboxylic acid salt based on the weight of the alumina is from 0.1–15% by weight of the alumina whereby a catalyst support having substantially diminshed pore volume in the range of 100–1200 Å is prepared.

I have discovered that aluminas formed in the presence of a water soluble polycarboxylic acid having from 2–22 carbon atoms will have pore distributions such that substantially all of the pore volume is below 200 Å in diameter. While this type of pore volume distribution can be obtained by carefully mechanically manipulating the precipitated alumina prior to forming to break down its pore volume, the addition of a polycarboxylic acid eliminate time consuming and expensive mechanical steps which may be involved.

Nitrogen adsorption pore volume data indicates that with the use of the compounds of my invention, pore volumes within the range of from 1200 to 100 Å are significantly reduced over catalyst supports which have not been treated. Mercury penetration porosimitry tends to confirm that my invention greatly reduces pore size in the area of between 140,000 to 200 Å in diameter.

In the typical use of my invention, an amorphous or pseudo-beohmite gel of aluminum hydroxide is prepared by well-known techniques. This can be done by precipitating aluminum hydroxide from any solution of soluble aluminum salts. Methods I prefer to use in the course of my invention have been fully described in numerous U.S. Patents including U.S. Pat. Nos. 2,943,065; 2,984,630; 2,988,520 and 2,996,460, all of which are hereinafter incorporated by reference into this application. My invention includes the use of any method of preparing an aluminum hydroxide gel which when purified, dried and calcined will produce a porous alumina. This alumina may or may not contain catalytically active metals.

Once the alumina has been prepared and precipitated, the moisture content is often reduced by filtration or spray drying so as to expedite the purification and subsequent steps taken. The alumina is then generally washed to purify it and is then formed followed by calcination and impregnation or, in the alternative, impregnating it with catalytically active metals and then forming and then calcining so as to prepare a hydrotreating catalyst. The forming step of the invention generally comprises extruding, prilling or otherwise shaping the alumina into a desired configuration. This shaping step may be done with alumina which has been impregnated or with alumina which has not been impregnated.

THE POLYCARBOXYLIC ACIDS

Mono-carboxylic acids and aldonic acids have been known in the art for their influence on alumina pore volumes (see U.S. Pat. No. 2,996,460). My invention shows that polycarboxylic acids eliminate most pores over 200 Å diameter (as determined by mercury porosimitry) when present during formation of the alumina. It is thought that the polycarboxylic acid may be promoting formation of an alumina with essentially bottle-shaped pores having openings of 100 Å in diameter or less.

The polycarboxylic acids useful in my invention are aliphatic, water soluble, and generally contain from 2-22 carbon atoms. The term polycarboxylic acid also encompasses in accordance with my invention amino substituted carboxylic acids such as ethylenediamine tetraacetic acid and nitrilotriacetic acid. Examples useful in my invention but which are non-limiting include the above and water-soluble aliphatic di-, tri-, and higher carboxylic acids, such as isosuccinic acid, succinic acid, citric acid, malonic acid, adipic acid, tartaric acid, oxalic acid and all other water soluble polycarboxylic acids falling within the terms of my invention providing that they are water soluble, aliphatic, and contain no more than 22 carbon atoms. Preferred polycarboxylic acids include citric acid and nitrilotriacetic acid.

The pore volume distributions of my samples were determined using Micromeritics commercial Mercury Penetration porisimeter (model 900/910 Series) and a Digisorb 2500 for nitrogen porisimitry.

The Mercury Penetration porisimeter determines the amount of mercury forced into a calcined, evacuated sample at a given pressure. An inverse relationship exists between this given pressure and the pore diameter penetrated. This relationship is defined in the well known Washburn equation $$P = \frac{-2\nu \cos\theta}{r}$$

where $\theta$ is the contract angle of the mercury with the sample. P is the pressure. r is the radius of the pore penetrated. $\gamma$ is the mercury surface tension. Using this relationship, surface tension, the pore diameter, pore-size distribution, and pore volume from 40 Å through 140,000 Å (diameter) can be calculated. The nitrogen proisimeter determines the nitrogen adsorption or desorption isotherm of a sample at liquid nitrogen temperature. The isotherm is a measure of the volume of nitrogen adsorbed or desorbed, for a given weight of sample, as a function of the relative pressure, P/Po. Here P is the actual vapor pressure and Po is the vapor pressure of the bulk nitrogen at the operating temperature. This isotherm data is translated into pore diameter, pore-size distribution and pore volume by means of a modified Kelvin equation. The corrections, for surface adsorbed nitrogen, are performed as described by B. F. Roberts, J. of Colloid and Interface Science 23, 266 – 273 (1967). The modified Kelvin equation assumes capillary condensation as open ended, non-intersection, cylindrical pores. Discussions of the theory and development of the Kelvin equation can be found in Gregg and Sing, *Adsorption, Surface Area and Porosity*, 1967, Academic Press, N.Y. The pore diameter range of the nitrogen porisimeter is 20 Å through 1200 Å.

In the practice of my invention from 0.1 to 15% and preferably from 2 to 10% by weight of the water soluble aliphatic polycarboxylic acid is present during the forming of the alumina based on the weight of $Al_2O_3$. The polycarboxylic acid employed within my invention may also, and is preferably, added in the form of a water soluble catalytically active metal salt such as in a solution of molybdenum, cobalt or nickel citrate which may or may not contain other catalytically active metals so as to produce an alumina which contains admixed a catalytically active metal or metals so as to form a catalyst at this point.

In order to further illustrate my invention the following examples are presented:

EXAMPLE I

To 1,640 milliliters of a solution containing 360 grams of $MoO_3$ per liter was added 2,000 milliliters of water and 1,618.3 grams $Co(NO_3)_2.6H_2O$ and the volume of the resulting solution was adjusted to 5,000 milliliters with water. The resulting solution is labeled Example I and stored.

EXAMPLE II

To a two gallon stainless steel container equipped with a stirring device and heated with a hot plate was added 3,340 milliliters of water, preheated to 80° F, 590 grams of $MoO_3$ and 273 g of $CoCO_3$. This mixture was heated to 180° – 190° F for a period of 45 minutes with constant stirring until the evolution of carbon dioxide ceased and a purple precipitate is formed. 417 grams of anhydrous citric acid was then added over a 10 minute period. A clear pink solution was obtained having a volume of approximately 3,700 milliliters. Water was added to this solution to adjust to a volume of 4,500 milliliters. This solution was also saved.

EXAMPLE III

A pseudo beohmite alumina was purified in gel form and was spray dried. Material had a free moisture content of approximately 13% as determined on an Ohaus moisture balance. Pore volume determination and other properties of this alumina can be found on Table I.

EXAMPLE IV 11.1 pounds of the alumina used in Examples III was placed in a muller and 5,000 milliliters of the solution prepared in Example I was added over a period of 3 minutes. The material was mulled for 10 minutes at which time 1,500 milliliters of water was added to adjust the free moisture. The material was mulled for an additional 10 minutes at which time it has a free moisture content of 56.5%. The mulled material was extruded through a ¼ inch die and then was reextruded through a 5/64 inch die. The extrudate was predried at 300° F and was calcined at 1,100 F for 3 hours. Physical properties of this catalyst are described on Table I.

EXAMPLE V 15 pounds of the alumina of Example III was placed in a "Sweco" dry grinder and the material was then ground for 45 minutes. This was repeated three times to obtain 45 pounds of material. Pore volume data and other physical properties are found on Table I.

EXAMPLE VI 11.1 pounds of the alumina of Example 5 was placed in a muller and 5,000 milliliters of the solution prepared in Example I was added over a period of 3 minutes. The material was mulled for 20 minutes. This material had a free moisture content of 51.5%. The mulled material was extruded through a ¼ inch die and then was reextruded through a 5/64 inch die. The extrudate was predried at 300° F and was calcined at 1100° F for 3 hours. Physical properties of this catalyst are described on Table I.

EXAMPLE VII 11.1 pounds (8.35 pounds dried basis) of the alumina of Example V was placed in a muller. To this material was then added 4,500 milliliter of the solution prepared in Example II. The material was mulled for 10 minutes at which time an additional 500 milliliters of water was added and the mull was continued for an additional 10 minutes. The free moisture at this time was 47%. The mulled material was extruded through a ¼ inch die, a portion of which was then reextruded through a 5/64 inch die. The material was predried at 300° F and calcined at 1100° F for 3 hours. Physical properties of this catalyst are found on Table I.

EXAMPLE VIII

Preparation of Impregnating Solution

To 2520 ml. of an aqueous solution containing 252 g/l as $MoO_3$, 58.41 g/l as CoO and 62.97 g/l as $P_2O_5$ was added 140 ml. of 85% phosphoric acid and 1840 ml. of water. The volume of the solution was 4500 ml.

Preparation of Catalyst 10.3 pounds (7.63 pounds of dry basis) of alumina from Example V was placed in a muller. With the muller on, the above solution was added over a 5 minute period. This solution is similar to that disclosed in U.S. Pat. No. 3,232,887. This material was mulled for 20 minutes at which time an additional 200 ml. of water was added. Mulling was continued until the material was well mixed, giving a powder having free moisture content of 46%. The material was then extruded through a ¼ inch die. The ¼ inch size extrudate was then reextruded through a 0.073 inch diameter die. This material was then predried at 300° F and calcined at 1100° F for 3 hours. Physical properties of this catalyst are described in Table I.

EXAMPLE IX

The procedure of Example VIII was followed with the exception being that the impregnating solution used contained 417g of anhydrous citric acid. This material after mulling had a free moisture content of 45% and was extruded, dried, and calcined in the same manner as the previous example. Physical properties of this catalyst are described in Table I.

EXAMPLE X

The procedure of Example VIII was followed with the exception being that the impregnated solution contained 208g of anhydrous citric acid. The material had a free moisture content of 45% prior to extrudation and was extruded, dried, and calcined in the manner described above. Physical properties of this catalyst are described in Table I.

TABLE I

| PROPERTY | | EX. III | EX. IV | EX. V | EX. VI | EX. VII | EX. VIII | EX. IX | EX. X |
|---|---|---|---|---|---|---|---|---|---|
| Surface Area (1) | | 338 | 350 | 374 | 337 | 308 | 304 | 314 | 322 |
| $N_2$ Pore Vol. Distribution (2) | | | | | | | | | |
| Volume less than | | | | | | | | | |
| | 1200 – 100 A | 0.830 | 0.247 | 0.700 | 0.181 | 0.109 | 0.318 | 0.062 | 0.093 |
| | 600 – 100 A | 0.564 | 0.247 | 0.469 | 0.172 | 0.100 | 0.230 | 0.056 | 0.084 |
| | 400 – 100 A | 0.466 | 0.183 | 0.364 | 0.160 | 0.092 | 0.161 | 0.050 | 0.076 |
| | 200 – 100 A | 0.297 | 0.133 | 0.216 | 0.121 | 0.069 | 0.101 | 0.038 | 0.059 |
| | 100 A | 0.440 | 0.415 | 0.387 | 0.392 | 0.369 | 0.314 | 0.323 | 0.330 |
| | 1200 – 200 A | 0.533 | 0.114 | 0.484 | 0.060 | 0.040 | 0.217 | 0.024 | 0.034 |
| | 600 – 200 A | 0.267 | 0.114 | 0.253 | 0.051 | 0.031 | 0.129 | 0.018 | 0.025 |
| | 400 – 200 A | 0.169 | 0.050 | 0.148 | 0.160 | 0.023 | 0.060 | 0.012 | 0.017 |
| | 200 A | 0.737 | 0.548 | 0.603 | 0.513 | 0.438 | 0.415 | 0.361 | 0.389 |
| | 1200 – 400 A | 0.266 | 0.064 | 0.336 | 0.021 | 0.017 | 0.157 | 0.012 | 0.017 |
| | 600 – 400 A | 0.098 | 0.064 | 0.105 | 0.012 | 0.008 | 0.069 | 0.006 | 0.008 |
| | 400 A | 0.906 | 0.598 | 0.751 | 0.552 | 0.461 | 0.475 | 0.373 | 0.406 |
| | 1200 – 600 A | 0.266 | 0.000 | 0.231 | 0.009 | 0.009 | 0.088 | 0.006 | 0.009 |
| | 600 A | 1.004 | 0.662 | 0.856 | 0.564 | 0.469 | 0.544 | 0.379 | 0.414 |
| | 1200 A | 1.270 | 0.662 | 1.087 | 0.573 | 0.478 | 0.632 | 0.385 | 0.423 |

TABLE I-continued

| PROPERTY | EX. III | EX. IV | EX. V | EX. VI | EX. VII | EX. VIII | EX. IX | EX. X |
|---|---|---|---|---|---|---|---|---|
| Hg Pore Volume | | | | | | | | |
| 140,000 – 200 A (2) | 1.450 | 0.107 | 1.777 | 0.0204 | 0.0134 | 0.233 | 0.012 | 0.012 |
| ABD (3) | 0.27 | 0.58 | 0.22 | 0.72 | 0.77 | 0.605 | 0.85 | 0.84 |
| # Crush (4) | | 10.8 | | 22.0 | 18.8 | 12.0 | 26.0 | 23.2 |
| % Non-Attrition (5) | | 90.2 | | 97.5 | 94.5 | 97.5 | 90.0 | 93.5 |
| % MoO$_3$ | | 14.2 | | 14.9 | 14.2 | 15.14 | 14.6 | 14.3 |
| % CoO | | 3.61 | | 3.77 | 3.81 | 3.75 | 3.53 | 3.33 |
| % Volatile | 27.81 | 0.70 | | 0.99 | 0.61 | 0.89 | 0.57 | 0.86 |
| % Al$_2$O$_3$ | | 79.0 | | 78.0 | 78.0 | 72.0 | 73.0 | 74.0 |
| Average Volume (6) | | 1.28 | | 1.37 | 1.25 | 1.76 | 1.19 | 1.45 |
| Average Weight (7) | | 1.43 | | 1.23 | 1.03 | 1.83 | 0.88 | 1.13 |

EXAMPLE XI

A pseudo boehmite alumina was purified in the gel form and was spray dried. The material had a free moisture content of 13% as determined on an O'Haus Moisture Balance. 15 pounds of this alumina was placed in a grinding mill and ground for 45 minutes. 12.5 pounds (9.38 pounds dry basis) of this alumina was then placed in a muller and 5600 ml. of water was added over a period of 5 minutes. The material was mulled for 20 minutes after which time it had a free moisture current of 55%. The mulled material was extruded through a ¼ inch die and was then reextruded through a 0.073 inch diameter die. This material was then predried at 300° F and was then calcined at 1100° F for 3 hours. Physical properties of this alumina are described in Table II.

EXAMPLE XII

An alumina was prepared for this example in the same manner as in previous Example XI. 12.5 pounds of this alumina was placed in a muller and 5300 ml. of a 3.86% by weight citric acid solution was added over a period of 5 minutes. The material was then mulled for 20 minutes, after which it had a free moisture content of 51%. The mulled material was then extruded through a ¼ inch die and was then reextruded through a 0.073 inch die. The extrudate was predried at 300° F and was then calcined at 1100° F for 3 hours. Physical properties of this alumina are found in Table II.

EXAMPLE XIII – XVI

Two samples of each of the catalyst supports prepared in Examples XI and XII were impregnated utilizing two different impregnating solutions. Solution 1 was similar to the solution described in Example II while Solution 2 was similar to that described in Example VIII and contained phosphorus. Impregnation was carried out in each case by pore volume techniques. Example XIII is a catalyst prepared from the alumina extrudates of Example XI impregnated with Solution 1. Example XIV is a catalyst prepared from the alumina extrudates of Example XI impregnated with Solution 2. Examples XV is a catalyst prepared from the alumina extrudates of Example XII impregnated with Solution 1. Example XVI is a catalyst prepared from the alumina extrudates of Example XII impregnated with Solution 2. Physical properties of these catalysts are found in Table II.

It is interesting to note that the phosphorus stabilized solutions had little or no effect on pore distribution on the catalysts prepared above, while the catalysts prepared using the alumina extrudates of Example XII prepared utilizing citric acid had pore volume distributions which were desired irrespective of whether the impregnating solution contained phosphoric acid. It is believed that these examples show the surprising effect achieved when the polycarboxylic acids of this invention are utilized.

TABLE II

| PROPERTY | | Ex. XI | Ex. XIII | Ex. XIV | Ex. XII | Ex. XV | Ex. XVI |
|---|---|---|---|---|---|---|---|
| Surface Area (1) | | 323 | 267 | 245 | 348 | 297 | 258 |
| N$_2$ Pore Vol. Distribution (2) | | | | | | | |
| Volume less than | | | | | | | |
| | 1200 – 100 A | 0.221 | 0.175 | 0.168 | 0.149 | 0.104 | 0.100 |
| | 600 – 100 A | 0.213 | 0.168 | 0.161 | 0.142 | 0.100 | 0.094 |
| | 400 – 100 A | 0.204 | 0.161 | 0.154 | 0.134 | 0.094 | 0.089 |
| | 200 – 100 A | 0.177 | 0.139 | 0.132 | 0.113 | 0.078 | 0.070 |
| | 100 A | 0.424 | 0.331 | 0.312 | 0.474 | 0.378 | 0.342 |
| | 1200 – 200 A | 0.044 | 0.036 | 0.036 | 0.036 | 0.026 | 0.030 |
| | 600 – 200 A | 0.036 | 0.029 | 0.029 | 0.029 | 0.022 | 0.024 |
| | 400 – 200 A | 0.027 | 0.022 | 0.022 | 0.021 | 0.016 | 0.019 |
| | 200 A | 0.601 | 0.470 | 0.444 | 0.587 | 0.456 | 0.412 |
| | 1200 – 400 A | 0.017 | 0.014 | 0.014 | 0.015 | 0.010 | 0.011 |
| | 600 – 400 A | 0.009 | 0.007 | 0.007 | 0.008 | 0.006 | 0.005 |
| | 400 A | 0.628 | 0.492 | 0.466 | 0.608 | 0.472 | 0.431 |
| | 1200 – 600 A | 0.008 | 0.007 | 0.007 | 0.007 | 0.004 | 0.006 |
| | 600 A | 0.637 | 0.499 | 0.473 | 0.616 | 0.478 | 0.436 |
| | 1200 A | 0.645 | 0.506 | 0.480 | 0.623 | 0.482 | 0.442 |
| Hg Pore Volume | | | | | | | |
| 140,000 – 200 A (2) | | 0.028 | 0.028 | 0.023 | 0.023 | 0.014 | 0.014 |
| ABD (3) | | 0.60 | 0.73 | 0.76 | — | 0.79 | 0.84 |
| # Crush (4) | | | | | | | |
| % Non-Attrition (5) | | | | | | | |
| % MoO$_3$ | | 0.1 | 14.2 | 13.2 | 0.1 | 14.2 | 14.0 |
| % CoO | | 0.1 | 3.90 | 3.25 | 0.1 | 3.87 | 3.40 |
| % Volatile | | 1.6 | 0.72 | 0.78 | 1.54 | 0.68 | 1.22 |
| % Al$_2$O$_3$ | | 96.0 | 78.0 | 78.0 | 96.0 | 78.0 | 77.0 |
| Average Volume (6) | | — | 1.94 | 2.05 | — | 1.84 | 1.88 |
| Average Weight (7) | | — | 1.73 | 1.74 | — | 1.59 | 1.46 |
| H$_2$O Pore Vol. Distribution | | | | | | | |
| Volume less than | 1200 A | 0.663 | 0.523 | 0.509 | 0.644 | 0.505 | 0.482 |
| | 600 A | 0.650 | 0.519 | 0.501 | 0.638 | 0.496 | 0.476 |
| | 400 A | 0.407 | 0.334 | 0.328 | 0.469 | 0.374 | 0.362 |

TABLE II-continued

| PROPERTY | | Ex. XI | Ex. XIII | Ex. XIV | Ex. XII | Ex. XV | Ex. XVI |
|---|---|---|---|---|---|---|---|
| | 1200 – 100 Å | 0.255 | 0.189 | 0.181 | 0.175 | 0.131 | 0.120 |

As seen, the difference in pore volume characteristics using the citric acid of our invention is dramatic. With the use of similar polycarboxylic acids results are obtained which may be equally beneficial.

I claim:

1. An improvement in a method for the preparation of an alumina useful as a support for a hydrotreating catalyst, said method generally comprising of:
   A. Precipitating an alumina;
   B. Reducing the moisture content of said alumina;
   C. Washing and purifying said alumina;
   D. Forming said alumina;
   E. Drying said alumina; and then,
   F. Calcining said alumina; the improvement consisting essentially of adding to the alumina prior to step D and after step C above an aqueous solution containing from 0.1 to 15.0% by weight based on the dry weight of the alumina of a water-soluble polycarboxylic acid having 2–22 carbon atoms whereby a catalyst support having substantially diminished pore volume in the range of 100–1200 Å is prepared.

2. The improvement of claim 1 wherein the polycarboxylic acid is citric acid.

3. An alumina support prepared by the improvement of claim 1.

* * * * *